United States Patent
Ermilios et al.

(10) Patent No.: US 10,789,731 B2
(45) Date of Patent: Sep. 29, 2020

(54) METHOD AND SYSTEM FOR DETECTING AN OBJECT ALONGSIDE A ROAD OF A MOTOR VEHICLE BASED ON AT LEAST TWO IMAGES OF AN ENVIRONMENTAL REGION OF THE MOTOR VEHICLE

(71) Applicant: Connaught Electronics Ltd., Tuam, County Galway (IE)

(72) Inventors: Pantelis Ermilios, Tuam (IE); Bryan Mcnamara, Tuam (IE); William O'Grady, Tuam (IE); Myles Friel, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 107 days.

(21) Appl. No.: 16/084,534

(22) PCT Filed: Mar. 10, 2017

(86) PCT No.: PCT/EP2017/055712
§ 371 (c)(1),
(2) Date: Sep. 12, 2018

(87) PCT Pub. No.: WO2017/157798
PCT Pub. Date: Sep. 21, 2017

(65) Prior Publication Data
US 2019/0080476 A1 Mar. 14, 2019

(30) Foreign Application Priority Data
Mar. 15, 2016 (DE) .................. 10 2016 104 730

(51) Int. Cl.
*G06T 7/80* (2017.01)
*G06T 7/223* (2017.01)
(Continued)

(52) U.S. Cl.
CPC ............ *G06T 7/80* (2017.01); *G06K 9/00791* (2013.01); *G06T 7/223* (2017.01); *G06T 7/50* (2017.01);
(Continued)

(58) Field of Classification Search
None
See application file for complete search history.

(56) References Cited

U.S. PATENT DOCUMENTS 5,990,941 A * 11/1999 Jackson ................ G06T 3/0062
348/207.99
2007/0127778 A1 6/2007 Fujimoto
(Continued)

FOREIGN PATENT DOCUMENTS

DE 102 44 148 A1 4/2004
DE 10 2004 001 572 A1 8/2005
(Continued)

OTHER PUBLICATIONS

K. Weber et al. "Insect Based Navigation and its Application to the Autonomous Control of Mobile Robots" http://dro.deakin.edu.au/eserv/DU:30044768/venkatesh-insectbased-1994.pdf—Nov. 1994 (Year: 1994).*

(Continued)

*Primary Examiner* — Mohammad H Ghayour
*Assistant Examiner* — Pawan Dhingra
(74) *Attorney, Agent, or Firm* — Osha Liang LLP

(57) ABSTRACT

The invention relates to a method for detecting an object (12) alongside a road (10) of a motor vehicle (1) based on at least two images (13) of an environmental region (9) of the motor vehicle (1) consecutively captured by at least one vehicle-side camera (4) for extrinsic calibration of the at least one camera (4), wherein the images (13) at least partially display a texture of a road surface (11) and wherein
(Continued)

Figure 1:
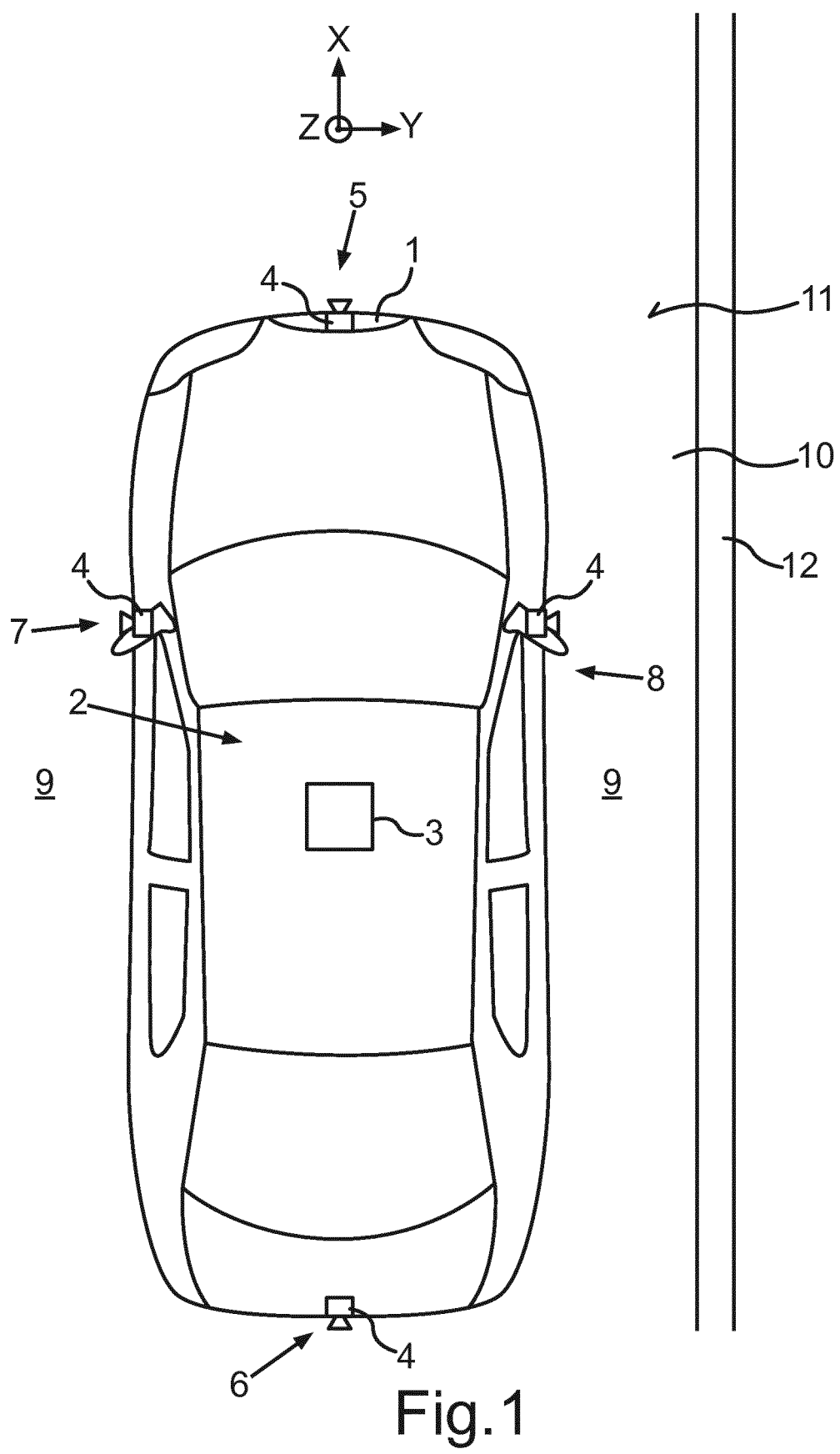

the following steps are performed: a) determining at least two mutually corresponding blocks (14) based on the at least two images (13); b) determining respective motion vectors for each of the at least two pairs of mutually corresponding blocks (14); c) determining a depth information concerning the at least two images (13) based on the at least two motion vectors; d) detecting the object (12) based on the depth information. The invention also relates to a computing device (3), a driver assistance system (2) as well as a motor vehicle (1).

12 Claims, 3 Drawing Sheets

(51) Int. Cl.
*G06T 7/50* (2017.01)
*G06K 9/00* (2006.01)
(52) U.S. Cl.
CPC ............ *G06T 2207/10016* (2013.01); *G06T 2207/30252* (2013.01)

(56) References Cited

U.S. PATENT DOCUMENTS

2014/0267608 A1    9/2014  Dhome et al.
2015/0086078 A1*   3/2015  Sibiryakov ............. G06T 7/262
                                                           382/104

FOREIGN PATENT DOCUMENTS

DE     10 2010 019 146 A1    11/2011
DE        102010062297 A1     6/2012
DE     10 2013 224 502 A1     6/2014
WO        2016/087298 A1      6/2016

OTHER PUBLICATIONS

International Search Report issued in PCT/EP2017/055712 dated Jun. 2, 2017 (3 pages).
Written Opinion of the International Searching Authority issued in PCT/EP2017/055712 dated Jun. 2, 2017 (7 pages).
German Search Report issued in DE 10 2016 104 730.9 dated Mar. 10, 2017 (10 pages).

\* cited by examiner

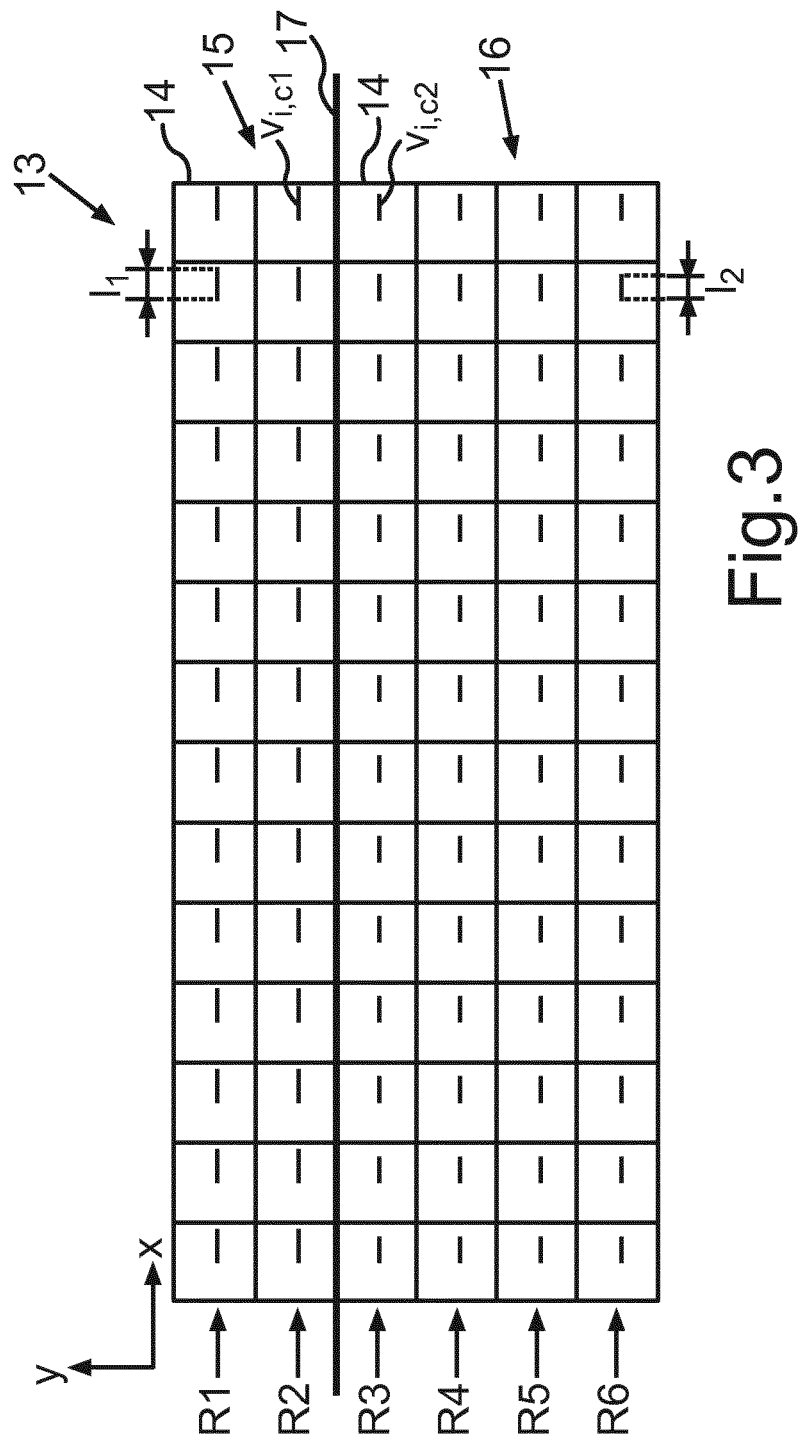

METHOD AND SYSTEM FOR DETECTING AN OBJECT ALONGSIDE A ROAD OF A MOTOR VEHICLE BASED ON AT LEAST TWO IMAGES OF AN ENVIRONMENTAL REGION OF THE MOTOR VEHICLE

The invention relates to a method for detecting an object alongside a road of a motor vehicle based on at least two images of an environmental region of the motor vehicle consecutively captured by at least one vehicle-side camera for extrinsic calibration of the at least one camera. In addition, the invention relates to a computing device, to a driver assistance system as well as to a motor vehicle with a driver assistance system.

Presently, the interest focuses on cameras for motor vehicles. The cameras are adapted to capture an environmental region in pictures or images. Information extracted from the images can be provided to a driver assistance system of the motor vehicle. Such information can comprise the presence of objects or obstacles in the vicinity of the motor vehicle. Object detection is known form the prior art, e.g. from US 2007/127778 A1, which describes an object detecting system including an imaging device disposed on a vehicle and a controller that receives a two-dimensional image, which represents a scene ahead of the vehicle, from the imaging device.

Moreover, objects can be derived from 3D range data obtained by stereo cameras, LIDAR or other means which is typically geared towards long-range detection and localisation of kerbs as road boundaries from front or rear facing cameras. Such prior-art typically involves complex analysis of the 3D point cloud often combined with image-brightness edge information in order to successfully localise and characterise kerbs. For some applications, it will be of main interest to detect the presence of objects in the images captured by the camera. In particular, the presence of elongated environmental features alongside the road standing above or below an average ground-level should be detected. Those elongated features can be walls, kerbs, ditches, vegetation or standing vehicles. In this context, complex analysis is not necessary since a classification or characterisation of the properties of these objects is not required.

It is the object of the present invention to provide a solution how objects in images can be detected in particularly fast and reliable manner and with low effort.

According to the invention, this object is solved by a method, a computing device, a driver assistance system as well as a motor vehicle comprising the features according to the respective independent claims. Advantageous embodiments of the invention are the subject matter of the dependent claims, of the description, and of the figures.

In an embodiment of the invention a method is provided which serves for detecting an object alongside a road of a motor vehicle particularly based on at least two images of an environmental region of the motor vehicle consecutively captured by at least one vehicle-side camera for extrinsic calibration of the at least one camera. Therein, the images at least partially display a texture of a road surface. Furthermore, at least two mutually corresponding blocks based on the at least two images can be determined, respective motion vectors for each of the at least two pairs of mutually corresponding blocks are determined and a depth information concerning the at least two images based on the at least two motion vectors is determined. Moreover, the object can be detected based on the depth information.

In a preferred embodiment of the invention a method is provided which serves for detecting an object alongside a road of a motor vehicle based on at least two images of an environmental region of the motor vehicle consecutively captured by at least one vehicle-side camera for extrinsic calibration of the at least one camera. Therein the images at least partially display a texture of a road surface. Furthermore, at least two mutually corresponding blocks based on the at least two images are determined. Respective motion vectors for each of the at least two pairs of mutually corresponding blocks are determined and a depth information concerning the at least two images based on the at least two motion vectors is determined. Moreover, the object is detected based on the depth information.

By means of the method, a reliable operating state of the at least one camera of the motor vehicle can be provided. The vehicle can comprise four cameras that form a surround view camera system, wherein a first camera can be disposed in a front area of the motor vehicle, a second camera can be disposed in a rear area of the motor vehicle, a third camera can be disposed on a driver's side of the motor vehicle, in particular on a driver's side wing mirror, and a fourth camera can be disposed on a passenger's side of the motor vehicle, in particular on a passenger's side wing mirror. The cameras can comprise fisheye lenses in order to enlarge an angle of view and thus a detection range of the cameras.

The cameras are adapted to represent the three-dimensional environmental region of the motor vehicle in a two-dimensional image or picture. Therefore, a camera model is usually provided to map the 3D world coordinates of the environmental region to 2D pixel coordinates of the image. The camera model usually is dependent on intrinsic camera parameters, like the focal length, the image sensor format and the principal point, and extrinsic camera parameters, like the spatial orientation and the height of the camera, also referred to as pose of the camera, wherein the extrinsic parameters are generally set by default. Those extrinsic parameters may not represent the real and current extrinsic parameters of the camera, for example due to mechanical tolerances in the vehicle manufacturing process, due to airmatic suspension or due to loading changes in the vehicle such as the number of passengers or the weight in a boot of the vehicle. Those erroneous extrinsic parameters can have negative impact on the rendering process or image synthesis. Thus, it is necessary to calibrate the camera in order to obtain reliable images which can be provided to a driver assistance system of the motor vehicle.

In order to provide a reliably and efficiently operating calibration method, it is one purpose of the method according to the invention to detect the presence of elongated environmental features or objects alongside the road standing above or below the average ground-level such as walls, kerbs, ditches, vegetation or standing vehicles since they have negative influence on the calibration method. At this, it is particularly not necessary to classify or characterise the properties of these objects, but only to detect their presence in a pair of image frames acquired from the at least one camera mounted on the vehicle, while the vehicle is particularly travelling approximately straight and parallel to the object, e.g. the kerb. Thus, an autonomous road based calibration method based on images captured by the camera can be provided that is not biased by the presence of such objects. In particular, identified images comprising such elongated features are tagged as unsuitable frames and, thus, are rejected. The method can be performed by a vehicle-side computing device which is adapted to identify such objects based on the at least two images captured by the at least one camera.

First, a so-called block matching operation is performed based on the at least two images in order to find corresponding blocks within the images. Corresponding blocks is understood to be image areas of two images or video frames which at least partially display the same environmental region. In other words, each pair comprises a first block as a first image region of a first image depicting a respective road surface area and a second block as a second image region of a second image at least partially depicting the road surface area of the corresponding first block. For block matching, at least two first blocks can be chosen as reference blocks at predefined fixed locations in the first image. The reference blocks can be adjacent or overlapping and their shape can be rectangular, circular or anything else. Preferably, adjacent rectangular blocks are arranged on a regular grid, or rather in rows and columns. The block size can vary, e.g. 8×8 pixels, 16×16 pixels, 24×24 pixels, 32×32 pixels or more, particularly depending on image quality. Then, the at least one second image, e.g. the previous frame, is searched for these second blocks comprising the same depiction as the corresponding first block at least in portions. Pixels within each block may be skipped or sub-sampled during the matching operation to advantageously speed-up the computation.

Such a block matching operation can be a full-search operation also referred to as exhaustive-search operation algorithm where all possible locations within the image or within a nominated search region in the image are checked as well as gradient-descent based methods such as diamond-search or hexagon-based-search. In order to identify the corresponding blocks in the at least two images, a cost function also referred to as a block distortion measure can be used such as cross correlation, sum of absolute differences, sum of squared differences or more advanced methods such as sum of absolute transformed differences, rank, census, frequency domain methods and more.

It proves advantageous if partial areas of the second image are defined as search regions which are searched for the second blocks in order to identify these second blocks corresponding to the respective first blocks. The search regions are image areas in the at least one second picture comprising the expected locations of the second blocks. By defining this search region, the second block can be found in a very fast manner. In particular, a position and/or a size of the search regions in the at least one second image are determined in dependency on a current velocity of the motor vehicle or a predetermined position and/or size of the search regions are predetermined in the at least one second image. The search regions can dynamically be positioned in each frame according to a prediction derived from the present value of the velocity of the motor vehicle. Alternatively, fixed search regions can be used, wherein the position and/or size is preset such that a predetermined operational speed range of the motor vehicle and the expected displacement of the blocks within the two images is covered.

After identifying the mutually corresponding blocks in the at least two images, the motion vector or displacement vector is determined for each pair of mutually corresponding blocks. For two pairs of mutually corresponding blocks, two motion vectors are determined. The motion vectors result from the motion of the vehicle and describe the displacement of the pixel positions or the location of two corresponding blocks between two sequenced images. The motion vectors can be described by a two-dimensional vector, given in image coordinates, with a first x-component and a second y-component. The x-axis particularly corresponds to an approximately straight driving direction of the motor vehicle and is orientated parallel to an orientation direction of the elongated object, or rather parallel to an edge of the road.

By means of the motion vectors, the depth information can be extracted from the at least two pictures. The invention is based on the knowledge that motion vectors derived from a pair of frames are in fact stereo correspondences and contain 3D depth information which, for instance, can be extracted via triangulation and known ego-motion. The vehicle and thus camera ego-motion can be derived from on-board odometry sensors of the motor vehicle or can be estimated computationally from the motion vectors. This is also referred to as visual odometry. It is also possible to obtain depth and ego-motion information simultaneously via bundle adjustment. Since for the camera calibration only the presence of the objects alongside the road is decisive, a proper 3D reconstruction of the ground surface can be renounced. Rather, sudden variations in depth alongside the road which indicates the presence of kerbs or similar features are detected by means of the motion vectors.

In summary, the method according to the invention has the advantage that it only analyses the depth information without classifying the objects. Thus, objects in images can be detected very fast and with low computational effort.

Particularly preferably, for determining the depth information, a length of each of the at least two motion vectors is determined and the object is detected based on a difference between the lengths of the at least two motion vectors. The invention takes the advantage that taller objects, like the elongated features alongside the road, are closer to the camera and, accordingly, produce longer motion vectors, or rather bigger disparities, than features on the ground surface, like the texture of the road surface. Therefore, the depth information can be derived in an easy manner by analysing or comparing the values for the length of two motion vectors.

In an advantageous embodiment, the at least two images are divided into multiple blocks arranged in columns and rows, wherein the determined motion vectors relating to a certain row and column each are determined and the differences between two motion vectors relating to two adjacent rows are determined by subtracting the motion vectors across each row from the motion vectors across a previous adjacent row. This means that each pair of corresponding blocks relates to a certain row and a certain column in one of the pictures, in particular in the second picture. Since the presence of an elongated object in a pair of frames can be inferred by a sudden variation in the length of the motion vectors between adjacent rows, the motion vectors across each row are subtracted from the corresponding motion vectors in the previous row. In other words each motion vector relating to a certain column and certain row is subtracted from the motion relating to the same column and the previous row. Thus, for two adjacent rows, a number of differences is determined which complies with the number of columns. Preferably, a median filter is applied to all differences across each row in order to remove outliers. In other words, the median filter is applied to all differences determined for two adjacent rows. The removal of outliers prevents the computing device of an erroneous detection of features.

It proves advantageous if for two adjacent rows an average difference is calculated based on the differences calculated for the two adjacent rows, wherein the object is detected if the average difference exceeds a predetermined threshold value. In other words, the average difference is computed to obtain a single score for the two adjacent rows. This score is compared to the threshold value, wherein the presence of the elongated object is detected if the score exceeds the threshold value and the absence is detected if the score falls below the threshold value. Accordingly, the score gives a binary classifier for the presence of a kerb or generally a sudden change in the depth of the ground surface.

In a development of the invention, for detecting the object the motion vectors are determined based on the at least two images only in case of a predetermined minimum speed of the motor vehicle. This means that the input frames are separated by a minimum required travel distance due to the condition of the minimum speed of the motor vehicle. This results in extracted motion vectors having a minimum length of a few pixels which thus carry less relative error. This can be achieved at normal driving speeds of the vehicle and/or by skipping frames at very low speeds. By ensuring the minimum speed of the motor vehicle, an error injected by the impact of observation noise, irregularities of the ground surface and vehicle oscillations caused by short motion vectors is reduced.

Preferably, a cost function describing a deviation between the motion vector of each pair and a predetermined vector is determined, a partially rotation-compensated motion vector is determined for each pair by minimizing the cost function and the depth information is determined based on the partially rotation-compensated motion vectors. Within this step, a partial extrinsic calibration is performed by finding in particular two spatial orientation components of the 3-DOF (degree of freedom) spatial orientation of the at least one camera relative to the ground plane by analysing the motion vectors generated by the block matching operation. Moreover, the orientation of the cameras is a first extrinsic parameter to be calibrated. The orientation can for example be expressed in a roll-pitch-yaw rotation scheme rotating in sequence about the fixed X-, Y- and Z-axes of the world coordinate system, where the X-axis is orientated along a longitudinal vehicle axis, the Y-axis is orientated along a transverse vehicle axis and the Z-axis is orientated along a vertical vehicle axis.

The cost function or loss function to be minimised is formulated that particularly exploits geometric properties of the motion vectors on the road surface or ground plane and the constraint for approximately straight driving. A calibrated system should produce motion vectors free from perspective distortion, i.e. motion vectors that are all parallel to the horizontal x-axis (in the image frame) and of equal length, while driving straight on a flat ground. Accordingly, the cost function indicates the difference between the present real condition and the ideal condition. Thus, the predetermined vector is the distortion-free vector parallel to the horizontal axis. In order to compensate for two of the three unknown extrinsic rotations, the cost function is determined merely based on a first component of the motion vector describing a displacement of two corresponding blocks along a predetermined direction. In particular, the cost function is determined dependent on the y-component of the motion vectors. The cost function is minimised in order to make all motion vectors horizontal, in particular without equalising their lengths. The motion vectors with directions orientated parallel to the horizontal x-axis are the partially rotation-compensated motion vectors. In particular, these partially rotation-compensated are used for extracting the depth information. More precisely, the values of length of the partially rotation-compensated vectors are determined. The differences are determined by subtracting the rotation-calibrated motion vectors across each row from the corresponding rotation-calibrated motion vectors in the previous row. In particular, the median filter is applied on these differences across each row to remove the outliers. Then, the average difference is computed to obtain the single score for that row for comparison with the predetermined threshold value. By partially calibrating the camera false positive detections, or rather the erroneous detection of the presence of the elongated object, can be avoided.

In an advantageous development of the invention, in case of detecting an absence of the object, an extrinsic calibration of the camera based on the at least two images is performed, wherein a rotation of the at least one camera is calibrated based on the partially rotation-compensated motion vectors by equalising a length of the partially rotation-compensated motion vectors, and a height of the camera is calibrated by determining a current height of the camera in dependency on the equalised length and an expected value of the equalised length. Within this step, the extrinsic calibration is completed by completing the orientation calibration and additionally performing a height calibration.

In particular, the extrinsic calibration of the camera, a so-called motion tracking calibration (MTC) operation, is performed based on the images captured by the at least one camera that at least partially show the road surface or ground surface in a vicinity of the motor vehicle as well as the texture being present on the surface such as tarmac, but that do not show the object. Using those images displaying the texture of the road surface, the computing device is moreover adapted to calibrate the camera, in particular without the requirement of any particular features of interest such as corners, contours, edges or lines to be present on the image.

First, rotation-compensated vectors are derived by equalising the length of the motion vectors. Then, the height of the camera as a second extrinsic parameter to be calibrated is determined by analysing the equalised rotation-compensated motion vectors which are derived from the minimisation of the cost function. The height can be an absolute height of each camera from the ground surface or a relative height between the cameras of the motor vehicle.

The length of the corrected, rotation-calibrated motion vectors of the camera is proportional to the velocity or speed of the vehicle and inversely proportional to the height of the camera from the ground plane. The expected length corresponds to the length of the predetermined vector and is dependent on the velocity of the motor vehicle. Therefore, the expected value for the length is advantageously preset in dependency on the velocity of the vehicle. In particular, the velocity of the motor vehicle is determined by means of odometry of the motor vehicle and/or based on at least one further motion vector, which is determined based on images captured by at least one further camera of the motor vehicle. The odometry is the use of data from motion sensors of the motor vehicle, e.g. wheel rotation, steering angle, etc., to estimate a vehicle's change in position over time. Additionally or alternatively, motion vectors from more than one camera can be considered. Therefore, the height of the camera can be determined by adjusting the value of the height of each camera such that the re-projected motion vectors have equal length in all cameras. For this purpose it proves advantageous, if a mean length of the motion vectors of the mirror left and mirror right cameras are taken as a reference and the value of the height of the other cameras is adjusted to match it, since the mirror cameras are affected the least by loading changes of the motor-vehicle.

The extrinsic calibration of the camera is only performed based on the images or image regions, in which images or image regions the absence of the elongated object was detected. Thus, the MTC only requires a textured surface such as tarmac on which it tracks simultaneously a large number of features instead of lines or point-like features. These features are particularly small blocks of texture at predefined locations on a grid whose presence can always be assumed without waiting for it. They are matched in a pair of frames using the block matching operation giving a set of motion vectors as input to the calibration. In other words it is not waited for good strong features to appear randomly in the image. During the calibration, which uses the motion vectors, the images displaying the elongated objects can be identified by means of the depth information provided by the motion vectors and be efficiently rejected.

Since most autonomous road based calibration algorithm that is seeking the 3-DOF orientation of a camera relative to the road or ground surface particularly needs to get a ground reference at some point by matching or tracking features or a subset of features on the ground surface it may be hard to differentiate between features that are truly on the ground surface and features that are in close proximity to it due to sparse detection of features and observation noise. However, accepting all feature matches unconditionally can lead to significant errors when computing the extrinsic calibration especially when features off the ground surface occur persistently in a number of frames such as when driving alongside the kerb. Therefore, it is very beneficial to recognize and particularly remove those frames displaying such a feature.

It proves advantageous, if in case of images captured by a camera comprising a fisheye lens a fisheye distortion of the images is removed before identifying the mutually corresponding blocks. In this step, a so-called virtual plan view of the environmental region or rather of the road surface captured by the fisheye camera is generated before performing the block matching operation. Therefore, the camera images in the form of fisheye distorted images can be transformed according to the known intrinsic calibration or intrinsic parameters of each camera and the current extrinsic calibration which initially, e.g. in an uncalibrated camera, equates to the nominal default extrinsic calibration. Accordingly, the fisheye distortion can completely be removed from the images. The virtual plan view may be generated with the help of a look-up table and may incorporate an anti-aliasing filter during rendering to improve image quality and thus tracking performance. This is very beneficial as it allows for rectangular regions of interest (ROI) or blocks in the images. It normalises the appearance of textures between frames which improves tracking performance substantially and removes pixel-level bias or systematic errors from the calibration. Thus, the virtual plan view provides automatically scale, rotation, affine and perspective invariance for all features on the ground surface.

The invention additionally relates to a computing device for a driver assistance system of a motor vehicle, which is adapted to perform a method according to the invention. The computing device can be integrated into a vehicle-side control unit. The computing device is adapted to detect the presence or absence of elongated objects in images captured by the at least one vehicle-side camera. Furthermore, the computing device is adapted to calibrate the at least one camera, in particular each vehicle-side camera individually, during vehicle motion by means of the images, wherein the images particularly display the texture and no elongated objects.

Moreover, the invention additionally relates to a driver assistance system for a motor vehicle comprising at least one camera and a computing device according to the invention. The driver assistance system supports a driver of the vehicle by means of the cameras monitoring the environmental region of the vehicle. The driver assistance system can comprise four cameras forming a surround view camera system. The cameras can also comprise fisheye lenses enlarging a detection area of the cameras. The driver assistance system may reliably detect objects in the images captured by the calibrated cameras and thus, may support the driver of the vehicle, for instance by producing a warning signal or automatically braking the motor vehicle when detecting an imminent collision of the motor vehicle with the detected object.

A motor vehicle according to the invention includes a driver assistance system according to the invention. The motor vehicle is in particular configured as a passenger car.

The preferred embodiments presented with respect to the method according to the invention and the advantages thereof correspondingly apply to the computing device, to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are also to be considered as disclosed, in particular by the explanations set out above, which extend beyond or deviate from the feature combinations set out in the relations of the claims.

Now, the invention is explained in more detail based on preferred embodiments as well as with reference to the attached drawings.

Figure 2:
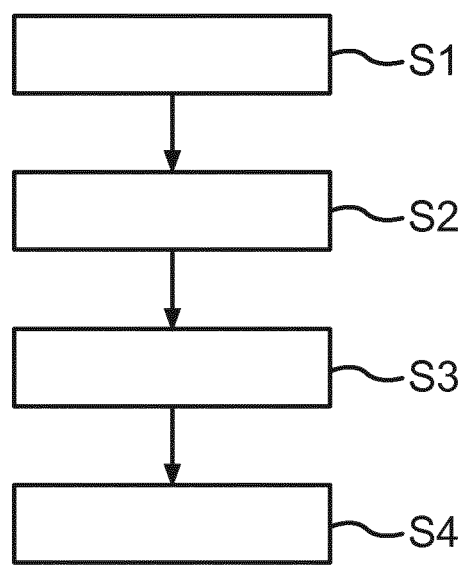

These show in:

FIG. 1 a schematic representation of an embodiment of a motor vehicle according to the invention;

FIG. 2 a schematic representation of a flow chart of an embodiment of a method according to the invention;

FIG. 3 a schematic view of images divided into blocks as well as a schematic view of motion vectors:

FIG. 1 shows a motor vehicle 1 according to the present invention. In the present case, the motor vehicle 1 is configured as a passenger car. The motor vehicle 1 has a driver assistance system 2 for supporting a driver of the motor vehicle 1. The driver assistance system 2 comprises a computing device 3, which can for example be formed by a vehicle-side control unit. Additionally, the driver assistance system 2 comprises at least one camera 4. In the present case, the driver assistance system 2 includes four cameras 4, wherein a first camera 4 is disposed in a front area 5 of the motor vehicle 1, a second camera 4 is disposed in a rear area 6 of the motor vehicle 1, a third camera 4 is disposed on a driver's side 7 of the motor vehicle 1, in particular on a wing mirror of the driver's side 7, and a fourth camera 4 is disposed on a passenger side 8 of the motor vehicle 1, in particular on a wing mirror of the passenger's side 8. The cameras 4 disposed on the driver's side 7 and the passenger's side 8 can also replace the wing mirrors, whereby the motor vehicle 1 can be designed as a mirrorless vehicle 1 enabling mirrorless driving. By means of the cameras 4, an environmental region 9 of the motor vehicle 1 can be captured in images. The cameras 4 can comprise fisheye lenses in order to enlarge an angle of view and thus a detection range of the cameras 4.

The cameras 4 are adapted to display the three-dimensional environmental region 9 of the motor vehicle 1 in the form of two-dimensional images. Therefore, the cameras 4 can transform the 3D world coordinates into 2D pixel coordinates based on the knowledge of intrinsic and extrinsic parameters of the camera 4. For instance, such intrinsic parameters are the focal length and the image sensor format of the camera 4. Extrinsic parameters particularly comprise a pose of the camera 4 describing a spatial orientation of the cameras 4 and a height of the cameras 4 given in a roll-pitch-yaw coordinate system, X, Y, Z. Since the cameras 4 may change their pose due to load of the vehicle or due to shocks during movement of the motor vehicle 1, the computing device 3 is adapted to perform an extrinsic calibration of each camera 4 individually during motion of the vehicle 1 on a road 10, in particular during an approximately straight motion.

Therefore, the camera 4 to be calibrated captures at least two images in sequence, wherein the images at least partially display a texture of a road surface 11 of the road 10. The texture particularly comprises tarmac. In order to calibrate the cameras 4 using the at least two images the computing device 3 is adapted to perform an autonomous road based extrinsic calibration method, a so-called motion tracking calibration, MTC. The calibration method results in a single calibration result by analysing the pair of successive images or pictures frames, in particular from each camera 4, while the motor vehicle 1 is moving, in particular within acceptable speed and steering tolerances.

Here, the motor vehicle 1 is travelling parallel to an elongated object 12 alongside the road 10. In the present case, the object 12 is a kerb. The object 12 can also be a wall, a ditch, vegetation or a standing vehicle. In case of these objects 12 being present in the images captured by the camera 4, the calibration could be biased. Therefore, the presence of those elongated environmental objects 12 or features alongside the road 10 standing above or below the average ground-level shall be detected. It does not attempt to classify or characterise the properties of these objects but only to detect their presence in a pair of image frames, e.g. acquired from the uncalibrated camera 4 mounted on the vehicle 1 while the vehicle 1 is travelling approximately straight and parallel to the kerb or object 12. In case of recognizing such elongated features 12 the respective frames can be labelled as unsuitable frames and, thus, be rejected in order to produce a calibration that is not biased by the presence of such objects 12. For detecting these objects 12, the computing device 3 is adapted to perform a method schematically shown in FIG. 2.

In a first step S1, two frames from the same camera 4 can be rectified into virtual plan views, a so-called top-down perspective, using the known intrinsic and nominal extrinsic calibration of that camera 4. In particular, step S1 is performed in case of cameras 4 having fisheye lenses in order to remove fisheye distortion from the images captured by the camera 4. The nominal extrinsic calibration is given by mechanical specification and particularly incorporates some error due to mechanical tolerances in the mounting of the camera 4. This can result in a non-ideal slanted virtual plan view exhibiting some perspective distortion.

In a second step S2, a block matching operation is performed which matches small rectangular blocks 14 (see FIG. 3) of pixels between the two images 13, particularly the virtual plan views, in a section that is relevant to each camera 4. The images 13 are described in image coordinates x, y.

Reference blocks can be chosen at predefined fixed locations in one frame, a first image, and searched within nominated search regions in another frame, e.g. a previous second image. The reference blocks can be adjacent or overlapping and their shape can be rectangular, circular or anything else. Typically, adjacent rectangular blocks arranged on a regular grid are used. The block size can vary (e.g. 8×8, 16×16, 24×24, 32×32 pixels or more) depending on image quality and the scale of the plan view. Pixels within each block 14 may be skipped, in particular sub-sampled, during the matching operation to speed-up computation. After identifying two mutually corresponding blocks 14 in the two images, for each pair of corresponding blocks 14 a motion vector or displacement vector is determined describing the displacement of the location of one image area displaying a certain road surface area between the images 13 due to vehicle motion. In other words, the block matching step S3 produces a set of motion vectors for each camera 4.

The search regions can be positioned dynamically in each frame according to a prediction derived from the current calibration and a vehicle odometry that can be published on a vehicle-side network, e.g. CAN or FlexRay. Using the vehicle odometry is not mandatory but simplifies the algorithm design. Alternatively, large fixed search regions can be used that cover a predetermined operational speed range and thus the expected displacement of blocks 14 within the two images 13. A multi-scale block matching approach or other intelligent methods could also be used to speed up the search without using the odometry.

Typical block matching algorithms can be used such as those used in motion estimation for video-compression. These include but are not limited to the full-search also referred to as exhaustive-search algorithm where all possible locations within the nominated search region are checked and also gradient-descent based methods such as diamond-search or hexagon-based-search. A typical cost function also referred to as block distortion measure can be used such as cross correlation, sum of absolute differences, sum of squared differences or more advanced methods such as sum of absolute transformed differences, rank, census, frequency domain methods and more.

In particular, the images or input frames are separated by a minimum required travel distance so that the extracted motion vectors have a minimum length of a few pixels and thus carry less relative error. This is achieved naturally at normal driving speeds of the motor vehicle 1 (depending also on the scale of virtual plan view) and/or by skipping frames at very low speeds of the motor vehicle 1. This is based on the knowledge that the impact of observation noise, irregularities of the ground surface 11 and vehicle oscillations injecting error into the computations is more significant with short motion vectors.

A third step S3 forms a partial calibration step which is performed on the extracted motion vectors to correct for the pitch and yaw camera rotations in relation to the vehicle transverse axis Y and vertical axis Z respectively leaving roll rotation in relation to the longitudinal axis X unchanged. This calibration can be performed correctly without requiring the features represented by the motion vectors to lie on the ground surface 11, i.e. it is not affected by the kerb 12 or similar objects. The advantage is that it removes most of the perspective error that may lead to false positive detections later. For calibration a cost function to be minimised is formulated that exploits the geometric properties of the motion vectors on the ground plane 11, in particular considering the constraint for approximately straight driving.

While driving straight on flat ground, a calibrated system should produce motion vectors on the virtual plan view free from perspective distortion i.e. motion vectors that are all parallel to the horizontal x-axis and of equal length. At the simplest, this objective can be expressed by the sum of squares of the y-components and the variance of the x-components of all motion vectors. For a calibrated camera in ideal conditions this would be zero. Here, the motion vectors are particularly calibrated by using only the y-component of the motion vectors seeking to make them all horizontal without equalising also their lengths. By minimizing the cost function the motion vectors can be mapped to partially rotation-compensated and calibrated motion vectors $v_{i,c1}$, $v_{i,c2}$ as shown in FIG. 3. The motion vectors $v_{i,c1}$, $v_{i,c2}$ are free from perspective distortion and are all parallel to the horizontal x-axis. The partially rotation-compensated motion vectors relating to a plurality of corresponding blocks can be re-projected on the plane of the road surface 11 or ground plane, wherein the re-projected, partially calibrated motion vectors particularly are orientated parallel to the longitudinal vehicle axis X.

The motion vectors derived from a pair of frames are in fact stereo correspondences and contain 3D depth information which can be extracted via triangulation and known ego-motion. Thus, in a fourth step S4, depth information is extracted from the images based on the motion vectors $v_{i,c1}$, $v_{i,c2}$ in order to detect the elongated object 12. The vehicle 1 and thus camera ego-motion can be derived from on-board odometry sensors or estimated computationally from the motion vectors, also referred to as visual odometry. It is also possible to obtain depth and ego-motion information simultaneously via bundle adjustment. However, any form of computation can be constrained significantly having regard to the predictable vehicle motion, the approximately known extrinsic camera calibration and the features near the ground surface in the vicinity of the car 1. For example, the camera 4 rotates approximately only about the vertical axis Z when the vehicle 1 is turning, the vehicle motion can be predicted sufficiently well from the on-board odometry sensors. The extrinsic calibration is particularly known from the mechanical specifications typically with a tolerance of +/−3 degrees error in any axis X, Y, Z. Taking into account these factors and incorporating them as constraints in the computation can lead in very stable solutions that would otherwise be very hard to achieve.

Since in particular primarily straight vehicle motion is concerned, the ego-motion reduces to a simple translation and no further compensation is required. For a rectified stereo image pair, the depth of a feature point, or rather a detection point associated with the object 12, is inversely proportional to its disparity.

In particular, the correlation is $z=f*b/d$, where z is the unknown depth, d is the known disparity, f is the focal length of the virtual cameras and b is the baseline. Linear motion and the virtual plan-view provide readily a rectified stereo image pair where the baseline equals to the distance of travel between two frames and the focal length is known by specification of the virtual camera used to generate the virtual plan views. The depth of a feature point can then be computed from its disparity which is equal to the length of the corresponding motion vector $v_{i,c1}$, $v_{i,c2}$.

Features at smaller depth usually have larger disparities. In other words features closer to the camera 4, such as the kerb 12, produce longer motion vectors $v_{i,c2}$ than features on the ground surface 11 as shown FIG. 3. Similarly features lower than the ground surface 11, such as ditches, produce shorter motion vectors. As can be seen in FIG. 3, the lengths $l_1$ of motion vectors $v_{i,c1}$ in a first block area 15 comprising a first and a second row R1, R2 are larger than the lengths $l_2$ of motion vectors $v_{i,c2}$ in a second block area 16 comprising a third, fourth, fifth and sixth row R3, R4, R5, R6. Thus, the motion vectors $v_{i,c1}$ in the first block area 15 result from an elongated object 12 alongside the road 10 and the motion vectors $v_{i,c2}$ in the second block area 16 belong to the road surface 11.

In other words, the presence of a kerb 12 in a pair of frames can be inferred by a sudden variation in the length $l_1$, $l_2$ of the motion vectors $v_{i,c1}$, $v_{i,c2}$ between adjacent rows, here between the second and the third row R2, R3 visually separated by a line 17. Since the interest is only directed to relative changes of depth it is not necessary to compute the actual depth of each feature. Instead, statistics can directly be applied on the length $l_1$, $l_2$ of the motion vectors $v_{i,c1}$, $v_{i,c2}$.

For this purpose, a heuristic method can be used. The motion vectors $v_{i,c1}$, $v_{i,c2}$ across each row R1 to R6 are subtracted from the corresponding motion vectors $v_{i,c1}$, $v_{i,c2}$ in the previous row R1 to R6. A median filter can be applied to these differences across each row R1 to R6 to remove outliers. Then, the average difference can be computed to obtain a single score for that row R1 to R6. A sudden change in depth between two successive rows, here between rows R2 and R3, produces a higher score. Thresholding the variance of the scores gives a binary classifier for the presence of a kerb 12 or generally a sudden change in the depth of the ground surface 11. This heuristic can tolerate calibration error in the roll of the camera 4, i.e. about the vehicle longitudinal axis X, as this changes the length $l_1$, $l_2$ of the motion vectors $v_{i,c1}$, $v_{i,c2}$ between different rows R1 to R6 in a uniform way. The calibration error in the pitch and yaw rotations has been already removed in step S3.

Furthermore, a depth map can be extracted directly from the motion vectors $v_{i,c1}$, $v_{i,c2}$, or rather the disparities, as explained earlier. Then, a 3D kerb model can be fit on the depth map. This model would consist at the simplest of two planes at different heights with one plane assumed to be the ground plane at Z=0. The location of the kerb edge could be parameterised by a line or a line constrained to be parallel to the longitudinal axis X. That would require one parameter for the height difference between the planes and one or two parameters for the line. The presence and location of the kerb 12 would be inferred from the model parameters and the goodness of fit. More complex models are also possible such as considering slanted planes or curved surfaces and/or a curved kerb edge.

The invention claimed is:

1. A method for detecting an object alongside a road of a motor vehicle based on at least two images of an environmental region of the motor vehicle consecutively captured by at least one vehicle-side camera for extrinsic calibration of the at least one camera, wherein the images at least partially display a texture of a road surface and wherein the following steps are performed:
   a) determining at least two mutually corresponding blocks based on the at least two images;

b) determining respective motion vectors for each of the at least two pairs of mutually corresponding blocks;

c) determining a depth information concerning the at least two images based on the at least two motion vectors; and d) detecting the object based on the depth information, wherein a cost function describing a deviation between the motion vector of each pair and a predetermined vector is determined, a partially rotation-compensated motion vector is determined for each pair of corresponding blocks by minimizing the cost function and the depth information is determined based on the partially rotation-compensated motion vectors, and in case of detecting an absence of the object in step d), the method further comprises:

an extrinsic calibration of the camera based on the at least two images, wherein a rotation of the at least one camera is calibrated based on the partially rotation-compensated motion vectors by equalising a length of the partially rotation-compensated motion vectors and a height of the camera is calibrated by determining a current height of the camera in dependency on the equalised length and an expected value of the equalised length.

2. The method according to claim 1, wherein for determining the depth information, a length of each of the at least two motion vectors is determined and the object is detected based on a difference between the lengths of the at least two motion vectors.

3. The method according to claim 2, wherein the at least two images are divided into multiple blocks arranged in columns and rows, wherein the determined motion vectors relating to a certain row and column each are determined and the differences between two motion vectors relating to two adjacent rows are determined by subtracting the motion vectors across each row from the motion vectors across a previous adjacent row.

4. The method according to claim 3, wherein a median filter is applied to all differences across each row in order to remove outliers.

5. The method according to claim 3, wherein for two adjacent rows an average difference is calculated based on the differences calculated for the two adjacent rows, wherein the object is detected when the average difference exceeds a predetermined threshold value.

6. The method according to claim 1, wherein for detecting the object the motion vectors are determined based on the at least two images only in case of a predetermined minimum speed of the motor vehicle.

7. The method according to claim 1, wherein the cost function is determined solely based on a first component of the motion vector describing a displacement of two corresponding blocks along a predetermined direction.

8. The method according to claim 1, wherein the expected value for the equalised length is preset in dependency on a velocity of the motor vehicle, wherein the velocity of the motor vehicle is determined by odometry and/or based on at least one further motion vector, which is determined based on images captured by at least one further camera of the motor vehicle.

9. The method according to claim 1, wherein in case of images captured by a camera comprising a fisheye lens a step e) is executed before step a), in which step e) a fisheye distortion of the images is removed.

10. A computing device for a driver assistance system of a motor vehicle, which is adapted to perform a method comprising:

determining at least two mutually corresponding blocks based on the at least two images;

determining respective motion vectors for each of the at least two pairs of mutually corresponding blocks;

determining a depth information concerning the at least two images based on the at least two motion vectors; and detecting the object based on the depth information, wherein a cost function describing a deviation between the motion vector of each pair and a predetermined vector is determined, a partially rotation-compensated motion vector is determined for each pair of corresponding blocks by minimizing the cost function and the depth information is determined based on the partially rotation-compensated motion vectors, and in case of detecting an absence of the object, the method comprises:

an extrinsic calibration of the camera based on the at least two images, wherein a rotation of the at least one camera is calibrated based on the partially rotation-compensated motion vectors by equalising a length of the partially rotation-compensated motion vectors and a height of the camera is calibrated by determining a current height of the camera in dependency on the equalised length and an expected value of the equalised length.

11. A driver assistance system for a motor vehicle comprising: at least one camera; and a computing device according to claim 10.

12. A motor vehicle with a driver assistance system according to claim 11.

* * * * *